United States Patent Office 2,765,329
Patented Oct. 2, 1956

2,765,329

PROCESS FOR THE PREPARATION OF ALKYL-ALUMINUM HYDRIDES

Richard Vernon Lindsey, Jr., Marshallton, Del., assignor to E. I. du Pont de Nemours and Company, Wilmington, Del., a corporation of Delaware No Drawing. Application November 3, 1945, Serial No. 626,574

10 Claims. (Cl. 260—448)

This invention relates to hydropulse fuels, i. e., to compositions capable of reacting very rapidly with water with generation of a large volume of gas. More particularly, it relates to a process for preparing hydropulse fuels comprising as the active ingredients alkylaluminum hydrides.

Self-propelled devices such as torpedoes using the principle of hydropulsation have been the subject of much recent investigation. The driving force of hydropulse engines is supplied by a gas, e. g. hydrogen, generated by bringing in contact with water a chemical composition (hydropulse fuel) which reacts with it to evolve said gas. One of the essential requirements of a hydropulse fuel is that its reaction with water be practically instantaneous. For satisfactory results, the chemical used as fuel should be completely decomposed in a matter of a few milliseconds. Another requirement is that the specific gas production (volume of gas evolved per gram of fuel) be as high as possible. Very few chemicals fulfill these requirements.

Alkylaluminum hydrides have been found to be of great interest as hydropulse fuels. These materials, which have the general formula $R_nAlH_{3-n}$ where $n$ is 1 or 2 and R is an alkyl radical, have an exceedingly fast rate of reaction with water and a satisfactorily high specific gas production. Alkylaluminum hydrides have been briefly mentioned in the literature (Wiberg and Stecher, Zeitsch. Angew. Chemie 52, 372, (1939) and Ber. 76, 2003, (1942)) but their synthesis has involved a complicated process comprising the separate preparation of trialkylaluminums, followed by hydrogenation in the presence of a glow discharge.

An object of this invention is to provide gas-generating compositions comprising alkylaluminum hydrides. Another object is to provide a new and improved process for preparing gas-generating compositions comprising, in major amounts, alkylaluminum hydrides.

These objects are accomplished, in accordance with the invention, by reacting an alkylaluminum halide with an alkali metal hydride in an inert liquid diluent, i. e., a diluent which does not decompose either reactants or reaction product, and isolating the resulting product, which is in general a mixture comprising alkylaluminum hydrides in major proportion.

The invention is illustrated in the following examples, in which parts are by weight.

*Example 1*

A solution of 222 parts of methylaluminum dichloride ($CH_3AlCl_2$) in 462 parts of n-hexane is placed in a reaction vessel fitted with a reflux condenser, a gas-tight mechanical stirrer, and a device for adding controlled amounts of reactants, the vessel being heated by an oil bath to a temperature of 75 to 85 C. To this solution is added, in small portions over a period of 3 to 4 hours, 110 parts of finely divided sodium hydride, this and all subsequent operations being carried out in a dry, oxygen-free nitrogen atmosphere. After all the sodium hydride has been added, the first portions of which cause a vigorous reaction to take place, the mixture is refluxed gently for 2½ hours. The resulting product is filtered, the solid material washed with about 165 parts of n-hexane, the filtrate and washings combined, and the solvent removed therefrom by fractionation under reduced pressure (295 mm.) through a 2-foot column packed with glass helices. On distillation of the residue under high vacuum through a short Claisen-type column, there is obtained 24 parts of a viscous clear liquid boiling at 33–37° C. at 1 mm. pressure. This product, which is a mixture of methylaluminum dihydride, dimethylaluminum hydride and trimethylaluminum, is spontaneously inflammable in air and reacts completely with water in 16 to 25 milliseconds, 1020 cc. of a mixture of hydrogen and methane being evolved per gram. The calculated specific gas evolution for methylaluminum dihydride is 1520 cc. per gram.

*Example 2*

To a suspension of 11.6 parts of finely divided lithium hydride in 106 parts of isooctane in a reaction vessel of the type used in Example 1, heated in an oil bath at about 90° C., is added, over a period of 3 to 4 hours with stirring, a solution of 149 parts of ethylaluminum sesquibromide [$(C_2H_5)_3Al_2Br_3$] in 35 parts of isooctane. After the addition of all the ethylaluminum sesquibromide solution, the reaction mixture is refluxed gently for 10 hours and the product isolated in the same manner as described in Example 1, except that the solvent is removed at atmospheric pressure. There is obtained 40 parts (corresponding to 71.4% of theory based on ethylaluminum sesquibromide) of a clear, mobile liquid having a boiling point of 69 to 74° C. at 1 mm. This is a mixture of ethylaluminum dihydride, diethylaluminum hydride, and triethylaluminum, and it is spontaneously inflammable in air. When treated with water, 750 cc. of a mixture of hydrogen and ethane is evolved almost instantaneously, the material decomposing completely in 3 to 5 milliseconds. The calculated specific gas evolution for ethylaluminum sesquihydride is 930 cc. per gram.

*Example 3*

A solution of 112.5 parts of methylaluminum dichloride in 142 parts of anhydrous diethyl ether is added to a suspension of 19.5 parts of lithium hydride in 70 parts of anhydrous diethyl ether at such a rate that the ether is maintained at gentle reflux without external heat. After the addition is completed (3 hours) the mixture is refluxed for 3 hours, filtered, and the solid filtered off is washed with dry ether. The filtrate is substantially halogen-free. The ethereal solution is evaporated at 15 mm. pressure and the last traces of solvent are removed by heating at 60° C. under 1 mm. pressure. The residual reaction product is a white sticky solid (54 parts), insoluble in h-hexane and not completely redissolved by dry ether. Its specific gas evolution is 930 cc. per gram. The material may be purified by washing it with ether, filtering off the insoluble portion and evaporating the filtrate at 1 mm. pressure and room temperature. There is obtained a white halogen-free solid, spontaneously inflammable in the air and evolving 1265 cc. of gas per gram on contact with water (calculated 1520 cc.). The gas contains hydrogen and methane in the properties of 82% and 18%. The product prepared as described above apparently contains more methylaluminum dihydride than that of Example 1.

The starting materials used in the process described in the above examples are the alkylaluminum halides of the general formula $R_nAlX_{3-n}$ where $n$ is 1 or 2, X is halogen of atomic weight between 30 and 130, i. e., of group VII–B and 3d to 5th period of the periodic table (Merriam-Webster-New International Dictionary, 2d Edition, 1944, page 182), i. e., chlorine, bromine or iodine, and R is an alkyl group, preferably a lower alkyl of up to four carbons. Any such alkylaluminum halide may be employed. These compounds are prepared by reacting aluminum with an alkyl halide as described by Von Grosse and Mavity in J. Org. Chem. 5, 106, (1940). The primary reaction product is in general a so-called "aluminum sesquihalide" $R_3Al_2X_3$ which is a mixture of monoalkylaluminum dihalide and dialkylaluminum monohalide. The alkylaluminum sesquihalide may be used as such (see Example 2) or it may be separated into its components as described in the above-mentioned reference.

An alkali metal hydride may be used, including particularly the hydrides of alkali metals of atomic weight below 40 i. e. of group I–A and 2d to 4th period of the periodic table, i. e., lithium, sodium and potassium, which are the most available. Of these, lithium hydride appears to react most readily and most completely, particularly at the lower reaction temperatures, and it is therefore preferred.

Any liquid diluent which has substantially no decomposing action toward the reactants and reaction products is suitable. In view of the great reactivity of the starting materials and reaction products, the choice of a diluent is rather limited. The most suitable ones are the liquid hydrocarbons free from non-benzenoid unsaturation, e. g., n-hexane, cyclohexane, octane, petroleum ether, benzene, toluene, etc., or the saturated ethers such as dibutyl ether, glycol dimethyl ether, anisole, etc. Ether solvents may tend to give addition products, presumably oxonium salts or "etherates" with the alkylaluminum hydrides, but these either decompose during the isolation of the alkylaluminum hydrides or in any event do not interfere with the gas-producing reaction. For convenience in isolating the distillable alkylaluminum hydrides, the diluent should preferably have a relatively low boiling point, e. g. below 150° C. at ordinary pressure.

The diluent used must be anhydrous, and all manipulations must be conducted so as to exclude moisture and oxygen. On a laboratory scale, this may be done by operating in a closed box provided with sleeves for the operator's hands and through which a slow stream of dry nitrogen is continuously circulated.

The reaction temperature depends to some extent on the diluent used, and also on the reactivity of the alkali metal hydride. Ether diluents like diethyl ether appear to facilitate the reaction when the highly reactive lithium hydride is used, and the reaction temperature can then be as low as about 20° C. With hydrocarbon diluents the reaction is in general slower and it is desirable to operate at temperatures between 50 and 100° C. The reaction should be carried out at a temperature high enough to insure complete reaction but not so high that extensive decomposition or disproportionation of the ingredients takes place. The skilled experimenter will have no difficulty in selecting the best conditions for any given diluent and set of reactants.

Either reactant may be added to the other. However, it has been found in general preferable to add the alkali metal hydride to methylaluminum halides, and to use the reverse order of addition in preparing ethylaluminum hydrides.

The products of the reaction are in general mixtures of monoalkylaluminum dihydrides and dialkylaluminum monohydrides, probably containing also some trialkyluminums. In some cases they also have a minor amount of combined alkali metal. They are liquid-to-solid materials which may be isolated either by distillation, preferably under reduced pressure, or by evaporation of the solvent or recrystallization from an appropriate solvent. When these products are to be used as hydropulse fuels it is quite unnecessary to attempt to separate them into their individual components.

While the described process is suitable for the preparation of any alkylaluminum hydride, its greatest utility is in the preparation of materials wherein the alkyl group is low enough to give rise to a gaseous hydrocarbon on treatment with water. Therefore, the preferred products for hydropulse fuels are the methyl-, ethyl-, propyl-, isopropyl- and butyl-aluminum hydrides.

My invention is not limited to the exact procedural details shown and described for modifications thereof and deviations therefrom will occur to a person skilled in the art.

What is claimed is:

1. Process which comprises bringing an alkylaluminum halide wherein the halogen is of atomic weight between 30 and 130 in contact, in the absence of air and moisture, in an inert anhydrous liquid diluent with an alkali metal hydride.

2. Process which comprises bringing an alkylaluminum halide wherein the halogen is of atomic weight between 30 and 130 and the alkyl is of one to four carbons in contact, in the absence of air and moisture, at a temperature within the range 20° C. to 100° C., and in an inert liquid diluent, with an alkali metal hydride wherein the alkali metal is of atomic weight below 40.

3. Process which comprises bringing an alkylaluminum chloride wherein the alkyl group is of from one to four carbons in contact, in the absence of air and moisture, at a temperature within the range 50–100° C., and in a liquid alkane, with lithium hydride.

4. Process which comprises bringing a methylaluminum chloride in a liquid alkane in contact, in the absence of air and moisture and at 50–100° C., with lithium hydride.

5. Process which comprises reacting lithium hydride, in the absence of air and moisture, in a liquid alkane, and at 50–100° C. with an alkylaluminum halide wherein the halogen is of atomic weight between 30 and 130.

6. Process of claim 5 wherein the alkyl of the alkylaluminum halide is of one to four carbons.

7. Process of claim 5 wherein the alkyl of the alkylaluminum halide is of one to four carbons and the halogen is bromine.

8. Process which comprises reacting lithium hydride, in the absence of air and moisture, in a liquid alkane, and at 50–100° C. with an ethylaluminum bromide.

9. Process of claim 1 wherein the inert diluent is a liquid dialkyl ether and the hydride is lithium hydride.

10. Process which comprises bringing a methylaluminum chloride in a liquid alkane in contact, in the absence of air and moisture and at 50–100° C., with sodium hydride.

References Cited in the file of this patent
UNITED STATES PATENTS

| Number | Name | Date |
|---|---|---|
| 1,938,180 | Groll | Dec. 5, 1933 |
| 2,052,889 | Loder et al. | Sept. 1, 1936 |
| 2,270,292 | Grosse | Jan. 20, 1942 |
| 2,386,452 | Fleming | Oct. 9, 1945 |
| 2,388,428 | Mavity | Nov. 6, 1945 |